April 29, 1958    R. M. GREEN    2,832,474
SEPARATION BY CRYSTALLIZATION
Filed Nov. 8, 1954    2 Sheets-Sheet 1

INVENTOR.
R. M. GREEN
BY *Hudson and Young*
ATTORNEYS

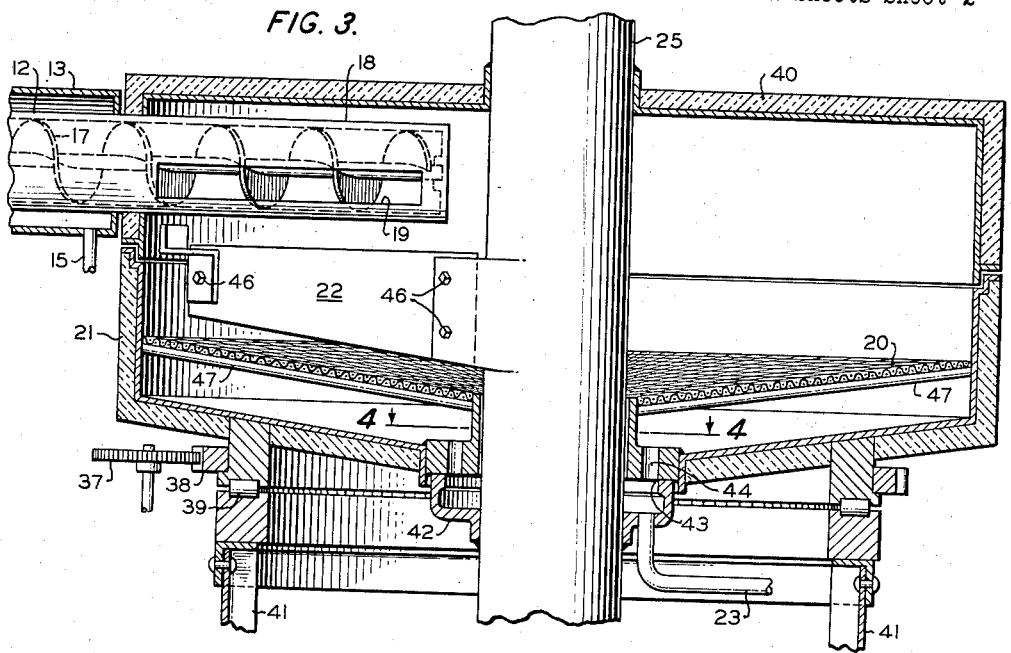
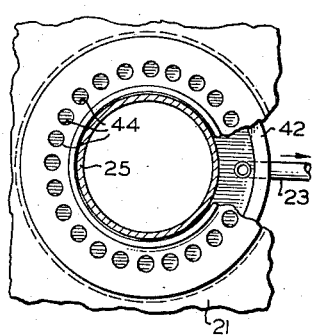
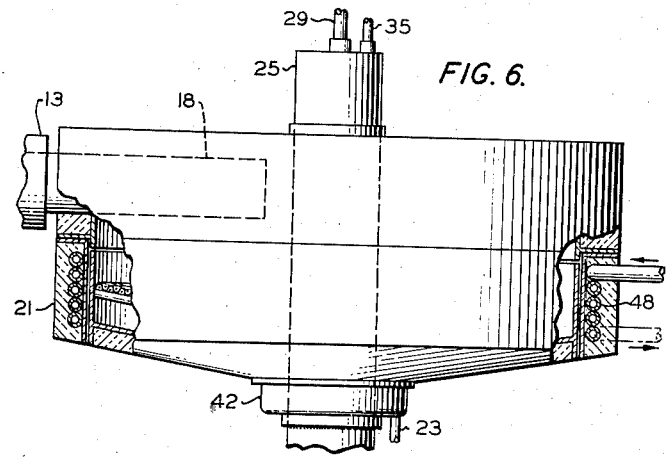
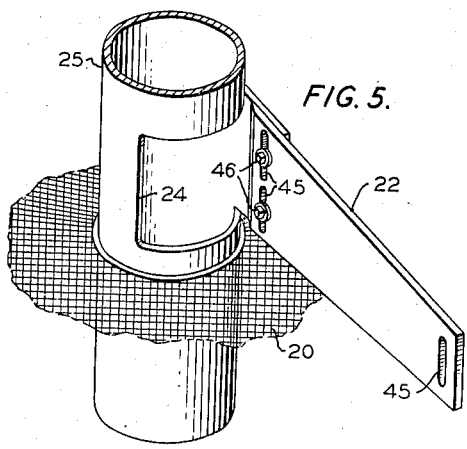
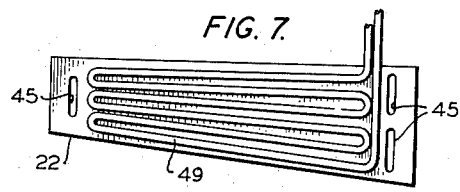

United States Patent Office 2,832,474
Patented Apr. 29, 1958

2,832,474

SEPARATION BY CRYSTALLIZATION

Richard M. Green, Borger, Tex., assignor to Phillips Petroleum Company, a corporation of Delaware Application November 8, 1954, Serial No. 467,489

13 Claims. (Cl. 210—179)

This invention relates to separation by crystallization. In one of its more specific aspects, the invention relates to improved apparatus for the separation of components of mixtures by fractional crystallization. In another of its more specific aspects, the invention relates to an improved method for separating the components of mixtures by fractional crystallization.

Separations of compounds may be effected by distillation, solvent extraction and crystallization. Although distillation and extraction are generally preferred because of economy and convenience of operation, there are some instances in which such processes cannot be successfully utilized. Many chemical isomers have similar boiling points and solubilities and cannot be separated satisfactorily by distillation or extraction. Separation by means of fractional crystallization can be satisfactorily utilized in many cases in making such separations. Fractional crystallization has one great advantage over other methods of separation in that it is the only separation method which theoretically offers a pure product in a single stage of operation in systems in which the desired component of a mixture solidifies at temperatures above that at which the other components solidify. Thus, whereas distillation and extraction theoretically require infinite stages for a pure product, crystallization in many cases requires only one. This is because of the nature of the phase equilibria in distillation and extraction, while by crystallization, substantially pure crystals can be formed from many solutions in one stage, although the desired component may be of low concentration in the liquid feed.

Crystallization is thus well suited, not only to the separation of many chemical isomers which can be separated by no other means, but also to the purification of many compounds which cannot be economically purified by other means. Whereas one stage of crystallization theoretically offers a pure product, attainment of this ideal stage has been difficult. Complete removal of occluded impurities without substantial loss in yield is required. This invention results in a very close approach to the ideal crystallization stage.

Methods of separating a pure component from a mixture have been devised whereby the mixture to be separated is introduced into a heat exchange zone wherein a mixture of crystals and liquid is formed and that mixture is then introduced into an elongated purification chamber through which the crystals are moved as a compact mass. One such means for purifying crystals has been disclosed by J. Schmidt, Re. 23,810.

In the process disclosed by J. Schmidt, a mass of crystals is moved through an elongated chamber to a melting zone wherein the crystals are melted. A portion of liquid corresponding to the melt is caused to move countercurrently through at least a portion of the crystal mass so as to displace occluded impurities from the crystal mass approaching the melting zone. The exact mechanism whereby this displacing liquid corresponding to the melt improves the purity of the final product is not completely understood. However, it is presently believed that the substantially pure material which is refluxed through at least a portion of the crystal mass displaces occluded impurities from the crystal mass approaching the melting zone and replaces the impurities in the interstices. At least a portion of the pure material is refrozen on the surface of the crystals. A high yield of product is obtained since the high melting product refreezes from the reflux stream as it comes in contact with the cold crystal mass moving toward the melting zone. Thus, the portion of the crystal mass which approaches the melting zone does not contain any appreciable amount of impurities and the resulting product which is removed from the melting zone is of extremely high purity.

In order to separate constituents of mixtures by fractional crystallization, it is necessary to adjust the temperature of the mixture to one which is below the temperature at which crystals form of any one of the pure constituents. For example, when para-xylene is separated from a mixture of isomeric $C_8$ alkyl benzenes, it is necessary to cool the mixture to a temperature in the neighborhood of about −57° to about −78° C.

When the crystals of para-xylene are introduced into a purification chamber wherein they are moved as a compact mass through the length of the chamber to a melt zone in a manner so as to displace a portion of the melt through at least a portion of the crystal mass, considerable difficulty is encountered. The substantially pure material obtained by melting crystals in the melt zone has, in many instances, such as in the case of para-xylene, a freezing point which is much higher than that of the desired material in admixture with the other components. For example, pure para-xylene has a freezing point of about 13° C. When such a high freezing point material is displaced through at least a portion of a crystal mass which is at a temperature much lower than the freezing point of that material, that relatively pure material solidifies in the interstices of the crystal mass to such an extent that it completely closes off further flow of the melt through the compact crystal mass. I have devised a method whereby continuous operation can be achieved at a high rate without encountering freezing of a solid impervious crystal plug in the purification chamber. This problem is, to my knowledge, only encountered in a system using a purification tube, such as is described hereinafter. This improvement is particularly important since it results in a recovery of a product of high purity at a very high rate.

It is highly desirable for the best operation of such a purification system to remove as much of the mother liquor from the crystals as possible before introducing those crystals into the purification chamber to be compacted. In this manner, many of the impurities can be eliminated from the purification system before subjecting the crystals to the final purification step.

I have devised a means whereby liquid is removed from the crystal mass prior to its introduction into a purification chamber and the relatively dry crystals are easily handled at a high rate.

The following are objects of the invention.

An object of the invention is to provide an improved system for the separation of a pure component from liquid mixtures. Another object of the invention is to provide an improved process for the separation of a pure component from a liquid mixture. Another object of the invention is to provide a method for rapidly separating a component having a relatively high solidification point from a liquid mixture which has a relatively low eutectic solidification point. Another object of the invention is to provide apparatus for rapidly separating a component having a relatively high freezing point from a liquid mixture which has a relatively low eutectic freezing point. Another object of the invention is to provide a process which will permit the continued displacement of pure material through at least a portion of a compacted crystal mass. Other and further objects of the invention will be apparent to those skilled in the art upon study of the accompanying disclosure.

Broadly speaking, this invention resides in a method and apparatus for purification of crystals wherein mother liquor is continuously removed from the crystals on a horizontal rotary filter while introducing the crystals into an upright purification chamber in which the crystals are moved as an elongated crystal mass through the purification chamber to a melting zone in the downstream end thereof. At least a portion of the crystals is melted and a small portion of the melt is displaced countercurrently through at least a portion of the crystal mass so as to displace occluded impurities therefrom.

The mother liquor is removed from the crystals by means of a rotary filter which closely surrounds and laterally extends from the purification chamber. The slurry of crystals is introduced onto the filter at a point near the periphery of the filter and the mother liquor is withdrawn downwardly through the filter surface while the crystals are carried on the filter surface around to a scraper blade positioned above the filter surface, which blade results in the movement of crystals into the purification chamber wherein the crystals are compacted and moved through that chamber by motivating means such as a piston. By removing liquid from the crystals in this fashion, it is possible to utilize fine or small crystals which tend to seal other filters. Such fine crystals are ordinarily difficult to handle in a relatively dry form. Dry crystals are readily handled in the device of this invention.

Although, as I have pointed out hereinbefore, this invention is particularly applicable to systems in which the temperature at which crystals of the desired pure component form is considerably higher than the temperature to which the component is cooled in the liquid mixture to form crystals thereof, this procedure can be advantageously utilized in practically any system to which fractional crystallization is applicable so as to increase the efficiency of the process. This invention is applicable to the separations in many multicomponent systems, the components of which have practically the same boiling point and are, therefore, difficult to separate by fractional distillation, or to mixtures which have diverse boiling points but which form azeotropes or are heat sensitive. The effective separation of components of such mixtures may be made from systems where the concentration of one component is relatively high, or where the concentrations of the components are about equal. One particular advantageous application of the process lies in the purification of a component of, say 15 to 25 percent purity, so as to effect a product purity upwards of 98 percent. In order to illustrate some of the systems to which the invention is applicable, the following compounds are grouped with respect to their boiling points.

| Group A | B. P., °C. | F. P., °C. |
|---|---|---|
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B. P., °C. | F. P., °C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B. P., °C. | F. P., °C. |
|---|---|---|
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B. P., °C. | F. P., °C. |
|---|---|---|
| Aniline | 184.4 | −6.2 |
| Toluene | 110.8 | −95 |
| Benzene | 80.0 | 5.5 |

| Group E | B. P., °C. | F. P., °C. |
|---|---|---|
| Carbon tetrachloride | 77 | −22.8 |
| Chloroform | 61 | −63.5 |
| $CS_2$ | 46.3 | −108.6 |
| Acetone | 56.5 | −95 |

| Group F | B. P., °C. | F. P., °C. |
|---|---|---|
| ortho-Xylene | 144 | −27.1 |
| meta-Xylene | 138.8 | −47.4 |
| para-Xylene | 138.5 | 13.2 |

| Group G | B. P., °C. | F. P., °C. |
|---|---|---|
| ortho-Cymene | 175.0 | −73.5 |
| meta-Cymene | 175.7 | <−25 |
| para-Cymene | 176.0 | −73.5 |

| Group H | B. P., °C. | M. P., °C. |
|---|---|---|
| Dimethyl phthalate | 282 | 5.5 |
| Dimethyl isophthalate | 124 (12 mm.) | 67 |
| Dimethyl terephthalate | 288 | 140.6 |

| Group I | B. P., °C. | M. P., °C. |
|---|---|---|
| ortho-Nitrotoluene | 222.3 | α−10.6 / β−4.1 |
| meta-Nitrotoluene | 231 | 15.5 |
| para-Nitrotoluene | 238 | 51.3 |

Systems consisting of any combination of two or more of the components within any one of the groups may be separated by the process of the invention, as well as systems made up of components selected from different groups; for example, benzene may be separated from a benzene-, n-hexane or n-heptane system in which the benzene is present in an amount greater than the eutectic concentration. In the same manner, para-xylene may be readily separated from a mixture of para- and meta-xylenes or from para-, meta-, and ortho-xylenes, or from a mixture of para-, meta-, and ortho-xylenes plus ethylbenzene and other compounds. Benzene may also be separated from a mixture of toluene and/or aniline. Multi-component systems which may be effectively separated so as to recover one or more of the components in substantially pure form include 2,2,-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

This invention can also be utilized to purify napthalene, hydroquinone, (1,4-benzenediol), paracresol, paradichlorobenzene, and such materials as high melting waxes, fatty acids, and high molecular weight normal paraffins. The system can also be used to separate anthracene, phenanthrene, and carbazole. Furthermore, the system can be used to separate durene (1,2,4,5-tetramethylbenzene) from $C_{10}$ aromatics. In cases where the material to be purified has a relatively high crystallization point, the impure material is raised to a temperature at which only a portion of the constituents are in a crystalline state and the resulting slurry is handled at such a temperature that operation is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

A more complete understanding of this invention will be obtained upon study of the accompanying drawings, in which:

Figure 3 is a section view of the horizontal filter taken on the line 3—3 of Figure 2;

Figure 4 is a sectional plan view of the purification column and outlet from the horizontal filter taken on the line 4—4 of Figure 3;

Figure 5 is a section view showing the scraper blade and opening into the purification column of this invention;

Figure 6 is a section view of the horizontal filter showing heating elements arranged in the wall of the filter; and Figure 7 is a back view of the scraper blade of the horizontal filter, showing heating elements operatively connected thereto.

Figure 1:
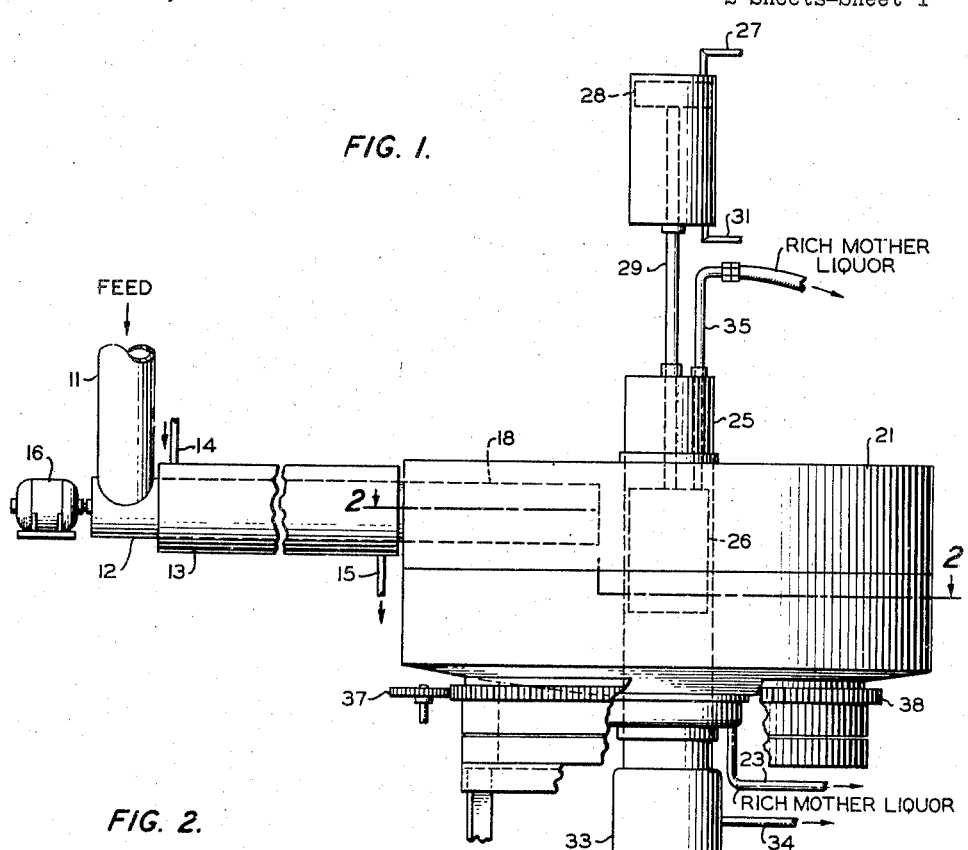
Figure 1 is an elevation of the combination horizontal filter-upright purification chamber of this invention.

Referring particularly to Figure 1 of the drawings, a mixture of materials from which at least one constituent is to be separated is fed through conduit 11 to a heat exchanger, such as heat exchanger 12 wherein the temperature of the mixture is adjusted so as to obtain crystals of at least a portion of at least one of the constituents of the mixture. Chiller 12 can be any conventional type heat exchanger and does not form an inventive feature of this invention. It is generally preferred that heat exchanger 12 be of the scraped surface type which is supplied with refrigeration means that are adequate to lower the temperature of the liquid mixture to that necessary to crystallize at least a portion of at least one of the constituents thereof. Heat exchanger 12 is, as shown in Figure 1 of the drawings, provided with a heat exchange jacket 13 through which the heat exchange fluid is passed by means of conduits 14 and 15. The temperature to which the mixture is adjusted in the heat exchanger will depend entirely upon the specific mixture, since the various materials will form crystals at different temperatures and the temperature at which crystals form of any given constituent of the mixture varies with the constitution of the mixture and the concentrations of the various materials of the mixture. When a mixture of isomeric $C_8$ alkyl benzenes is fed through conduit 11 to heat exchanger 12, that mixture is chilled to a temperature in the neighborhood of $-57°$ to $-78°$ C., depending upon the specific mixture.

Figure 2:
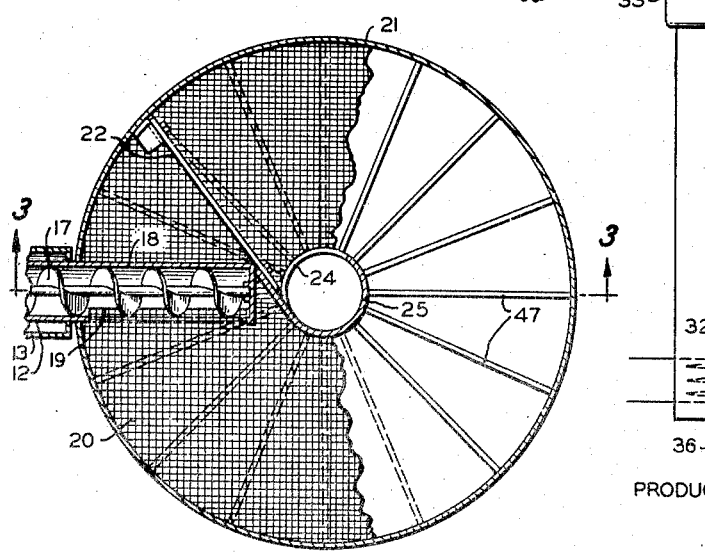
Figure 2 is a plan view of the system of Figure 1 taken on the line 2—2 of Figure 1.

Motor 16 operates a scraper which prevents a build-up of crystals on the wall of heat exchanger 12 and also acts as a conveyor which is more completely shown in Figure 2. The crystalline material is conveyed by means of conveyor 17 through an elongated conduit 18 from the downstream end portion of heat exchanger 12. Conduit 18 is provided with an open section 19 in the wall of its downstream end portion, which open portion permits the escape of crystals therethrough.

The open section 19 of conduit 18 is positioned over a screen 20 of rotary filter 21 so as to supply crystals substantially uniformly across the surface of the screen. As screen 20 is rotated, as shown in Figure 2 of the drawings, in a counterclockwise direction, the crystals are brought into contact with scraper 22 which spreads the crystals uniformly across the filter area, thus providing a thin layer of crystals from which liquid is permitted to drain, and in most cases from which liquid is drawn by means of a vacuum applied to the filter through conduit 23, shown in Figure 1 of the drawings. Screen 20 may be formed from any suitable filtering means, such as cloth, paper, felt, glass fabric, synthetic fabrics, perforated or porous (sintered) metal or any combination of these or other filtering media as is necessary to effectively retain crystalline solids and pass liquid in the filtration of crystal slurries. Screen 20 is preferably a filter cloth supported on a wire screen.

As the thickness of the layer of crystals builds up on the screen of filter 21, scraper blade 22, which is preferably positioned tangentially to purification column or tube 25, causes a portion of the crystals to be moved inwardly to the center of the filter where they are discharged through opening 24 in the wall of the purification tube or column 25. The crystals discharged into chamber 25 are moved in a downstream direction by some motivating means, such as piston 26, which is motivated by the flow of fluid through conduit 27 operating against piston 28 attached to piston 26 by means of piston rod 29. Piston 26 is retracted by means of fluid flow through conduit 31 acting against piston 28, thereby permitting the introduction of additional crystals into purification chamber 25 through opening 24. As the crystals are moved as a compact mass downwardly through chamber 25, the downstream end portion of that compact mass of crystals is brought into heat exchange relationship with heat exchanger 32 whereby at least a portion of the crystal mass is melted. A small portion of that melted material is displaced into the compact crystal mass whereby occluded impurities are displaced through the crystal mass in an upstream direction, with respect to crystal movement. Liquid material which is displaced in this fashion is removed from purification chamber 25 either through filter 33 and conduit 34 or, if a piston having a perforate face is utilized, a portion of the liquid material displaced from the crystal mass will be removed through piston 26 and conduit 35. Purified product is removed from the downstream end portion of purification column 25 through conduit 36.

Filter 21 is rotated by any conventional drive means, such as pinion 37 operated in connection with gear wheel 38 affixed to filter 21. Filter 21 preferably rotates on rollers 39, as shown in Figure 3, which are supported by a frame 41 from any suitable support source. Cover 40 is maintained in fixed and sealing relation with the upper edge of the rotating filter 21. Receiver chamber 42 is likewise supported in a stationary position, preferably riding on chamber 25, and its upper surface rests against the rotating lower surface 43 of filter 21 so as to form a rotary valve therebetween. Vacuum which is applied through conduit 23 draws liquid through the crystal mass which forms on screen 20. The liquid flows along the lower surface of filter 21 and is removed from that filter through openings 44 into receiver chamber 42, Figures 3 and 4. Scraper blade 22 is preferably adjustable in its spacing from screen 20 by means of slots 45 and fastener means, such as bolts 46, as shown in Figures 5 and 7.

Screen 20 is supported on support members 47, Figure 3, so as to maintain a uniform spacing between scraper blade 22 and screen 20. In some instances, it is desirable to provide heat along the lower side of the filter screen and this heat can be supplied by means of these support members which can be in the form of steam conduits or other conventional heating elements by minor modifications to provide connections with the energy source. Additional heat may be supplied to the lower portion of filter 21 by means of heating elements 48, Figure 6, in a stationary wall portion enclosing the rotating portion of the filter. Furthermore, in many instances, it is desirable to heat scraper blade 22 to prevent crystals from accumulating thereon. Heat may be supplied to that blade in any conventional manner, such as by the passage of the heat exchange medium through coils 49, Figure 7.

It will be apparent to those skilled in the art that various modifications of this invention can be made upon studying the accompanying disclosure. Such modifications are believed to be clearly within the spirit and the scope of this invention.

I claim:

1. In a crystal purification system the combination comprising an elongated tube, means for moving crystals as a compact mass through said tube toward a downstream end of said tube; an opening in said tube spaced from the downstream end thereof, means for removing purified product from the downstream end portion of said tube, an open topped chamber closely encircling said tube, extending laterally from the periphery of said tube and rotatable around said tube; a filter member spaced upwardly from the bottom of said chamber encircling and laterally extending from the periphery of said tube to the outer edge of said chamber, positioned adjacent the lower edge of said opening into said tube and rotatable with said chamber; scraper means extending outwardly from the opening in said tube across the surface of said screen member and spaced upwardly from said filter member and adapted to scrape crystals into said opening; liquid outlet means in the lower portion of said chamber; means for rotating said chamber; and means for introducing crystals onto the surface of said filter member.

2. In a crystal purification system the combination comprising an elongated tube, means for moving crystals as a compact mass through said tube toward a downstream end of said tube; an opening in said tube spaced from the downstream end thereof, means for removing purified product from the downstream end portion of said tube, an open topped chamber closely encircling said tube, extending laterally from the periphery of said tube and rotatable around said tube; a filter member spaced upwardly from the bottom of said chamber encircling and laterally extending from the periphery of said tube to the outer edge of said chamber, positioned adjacent the lower edge of said opening into said tube and rotatable with said chamber; scraper means extending outwardly from the opening in said tube across the surface of said filter member and spaced upwardly from said filter member and adapted to scrape crystals into said opening; liquid outlet means in the lower portion of said chamber; means for rotating said chamber; closure means affixed to said tube by a gas tight seal above said chamber and extending laterally and outwardly from said tube to the periphery of said chamber, forming a seal with said chamber; and means for introducing crystals onto the surface of said filter member.

3. In a crystal purification system comprising an elongated tube, means for moving crystals as a compact mass through said tube toward a downstream end of said tube; an opening in said tube spaced from the downstream end thereof, and means for removing purified product from the downstream end portion of said tube, the improvement which comprises an open topped chamber closely encircling said tube, extending laterally from the periphery of said tube and rotatable around said tube; a filter member spaced upwardly from the bottom of said chamber encircling and laterally extending from the periphery of said tube to the outer edge of said chamber, positioned adjacent the lower edge of said opening into said tube and rotatable with said chamber; scraper means extending outwardly from the opening in and tangent to said tube across the surface of said filter member, spaced upwardly from said filter member and adapted to move crystals through said opening; liquid outlet means in the lower portion of said chamber; means for rotating said chamber; closure means, affixed to said tube by a gas tight seal, above said chamber and extending laterally and outwardly from said tube to the periphery of said chamber, forming a seal with said chamber; conduit means extending through said closure member at its periphery and extending a substantial portion of the distance across said chamber toward said tube, said conduit means being open in its lower portion in a substantial portion of its length within said chamber; and conveyor means within said conduit adapted to move crystalline material into said chamber through the opening in said conduit.

4. The system of claim 3 wherein said filter member is supported on a plurality of support members extending radially from the periphery of said rotatable chamber to its inner edge.

5. The system of claim 4 wherein said filter support members comprise heating elements.

6. The system of claim 3 wherein said scraper member is adjustable in its spacing from said filter member.

7. The system of claim 3 wherein said filter member is supported by a plurality of support members extending radially from the periphery of said rotatable chamber to the inner edge of said chamber, said support members comprising heating elements; and heating means in the wall of said rotatable chamber.

8. The system of claim 3 wherein heating means are associated with said scraper member.

9. The system of claim 3 wherein a receiver chamber encircles and is maintained in a fixed position around said tube and cooperates with the lower surface of said rotatable chamber by means of a slide seal; and means connected to said receiver chamber to draw a vacuum on said rotatable chamber through openings in the lower portion of the rotatable chamber and through said receiver chamber.

10. Apparatus for separation by crystallization comprising, in combination, an upright, elongated closed chamber; a heater associated with the downstream portion of said chamber; piston means in the upstream end portion of said closed chamber for moving crystals as a compact mass through said chamber; means for removing liquid from an upstream portion of said elongated chamber; means for removing purified product from a downstream portion of said elongated chamber; an opening in the wall of an upstream portion of said elongated chamber; a rotatable chamber laterally extending from said elongated closed chamber, about said elongated chamber and enclosing said opening in the wall thereof; a filter member in the lower portion of said rotatable chamber and adapted to permit the movement of crystals from its surface through the opening in the wall of said elongated chamber; a closure member rigidly affixed to said elongated chamber and extending outwardly therefrom so as to close the upper portion of said rotatable chamber; a scraper spaced in fixed position above said filter member and adapted to move crystals across said filter member into the opening in said elongated chamber; means for moving crystals onto said filter member; means for rotating said rotatable chamber; and means for removing liquid from the lower portion of said rotatable chamber.

11. In a crystal purification system the combination comprising an elongated tube; means for moving crystals as a compact mass through said tube toward a downstream end of said tube; an opening in said tube spaced from downstream end thereof; means for removing purified product from the downstream end portion of said tube; a filter member encircling and laterally extending from the periphery of said tube adjacent the lower edge of said opening into said tube; a scraper extending from said opening in said tube outwardly across the surface of said filter member and spaced above said filter member and adapted to scrape crystals into said opening; heating means associated with said scraper; means for effecting relative rotary movement between said scraper and said filter member around the axis of said tube; and means for introducing crystalline material onto the surface of said filter member; and means for removing liquid which passes through said filter member.

12. Apparatus suitable for separation by crystallization comprising, in combination, an elongated tube having a downstream end and an opening spaced from said downstream end; means for moving crystals as a compact mass in said tube toward said downstream end; means for removing product from said downstream end of said tube; a filter member encircling and laterally extending from the periphery of said tube adjacent the lower edge of said opening into said tube; a scraping means extending from said opening in said tube outwardly across the surface of said filter member, spaced above said filter member and adapted to move crystals from said filter member through said opening into said tube, means for effecting relative rotary movement between said scraper and said filter member around the axis of said tube; means for introducing crystalline material onto the surface of said filter member; and means for removing liquid which passes through said filter member.

13. In a crystal purification system comprising an elongated tube, means for moving crystals as a compact mass in said tube toward a downstream end of said tube; an opening in said tube spaced from the downstream end thereof, and means for removing purified product from the downstream end portion of said tube; the improvement which comprises a chamber closely encircling said tube, extending laterally from the periphery of said tube and rotatable around said tube; a filter member spaced upwardly from the bottom of said chamber encircling and laterally extending from the periphery of said tube toward the outer edge of said chamber, positioned adjacent the lower edge of said opening into said tube and rotatable with said chamber, said chamber having an annular opening above said filter member and encircling said tube; scraper means extending outwardly from the opening in said tube across the surface of said filter member, spaced upwardly from said filter member and adapted to move crystals through said opening into said tube; liquid outlet means in said chamber below said filter member; means for rotating said chamber; stationary closure means forming a sliding seal over said annular opening in said chamber; conduit means extending through said closure means and extending a substantial portion of the distance between said tube and the periphery of said chamber, said conduit means being open in its lower portion in a substantial portion of its length within said chamber; and conveyor means within said conduit adapted to move crystalline material into said chamber through said opening in said conduit.

References Cited in the file of this patent

UNITED STATES PATENTS

| | | |
|---|---|---|
| 701,687 | Desaulles | June 3, 1902 |
| 2,636,612 | Cording et al. | Apr. 28, 1953 |
| 2,687,806 | Becker | Aug. 31, 1954 |
| 2,696,307 | Rush | Dec. 7, 1954 |
| 2,716,494 | Hursh | Aug. 30, 1955 |

FOREIGN PATENTS

| | | |
|---|---|---|
| 28,791 | Great Britain | of 1903 |
| 679,883 | Great Britain | Sept. 24, 1954 |
| 295,905 | Germany | Dec. 27, 1916 |